UNITED STATES PATENT OFFICE 2,562,867

UREA-ALDEHYDE SEALING AGENTS AND METHOD OF MAKING THE SAME

Stewart S. Kurtz, Jr., Merion, and James S. Sweely, Swarthmore, Pa., assignors to Sun Oil Company, Philadelphia, Pa., a corporation of New Jersey No Drawing. Application October 14, 1948, Serial No. 54,587

6 Claims. (Cl. 260—29.4)

This invention relates to a sealing agent and the preparation thereof and more particularly to an improved sealing composition adapted for plugging porous subterranean formations.

The novel sealing agent of the present invention comprises an aqueous suspension of a thermosetting resin prepared by causing urea and formalin or urea and furfural to react to a particular stage of condensation, as hereinafter fully described, and capable of further condensation to a hard infusible stage.

In the drilling of wells for oil, gas or other fluids the well bore traverses numerous formations or strata of varied porosity, such as cavernous limestone, gravel beds, oil-bearing sands, cavernous sandstones, water-bearing sands, gas-bearing sands and the like, it is frequently necessary or desirable for one reason or another to seal off certain of these formations from the borehole and many methods for effecting such sealing have been proposed. In drilling by the rotary method a drilling mud is circulated during the general drilling operation down through the drill pipe to the drill bit and thence back to the surface to overcome the formation pressure, lubricate the bit, carry cuttings to the surface and to wall off the borehole. It is not infrequent, however, that formations are encountered which are sufficiently porous that the mud fluid passes into the formation so that little or no mud returns to the surface. This condition, which is known as "lost circulation," may also be due to a breakdown of one or more of the formations traversed, caused by the high hydrostatic pressure exerted by the mud column on the formation as when the mud fluid has been heavily weighted with weighting material. In such cases steps must be taken to seal off the porous formation and prevent the loss of mud fluid. Again, it is often desirable to plug off certain strata in order to prevent or minimize ingress of undesirable fluids into the well. For instance, it may be desired to seal off water-bearing sands to increase the ratio of oil to water production.

Formerly it was general practice to accomplish such sealing operations by pumping cement grout into the well, forcing it into the porous formation, permitting it to harden in place and then drilling through the cement remaining in the borehole. Although in the case of lost circulation it has become customary more recently to add special sealing agents such as ground sugar cane stalks, mica or cellophane to the drilling fluid to improve its sealing properties, this has often proved unsuccessful, and consequently cementing operations are still used to an extent to overcome this condition. Since it is often impossible to determine the exact zone of lost circulation, a considerable amount of cement grout (sometimes five hundred feet or more) may have to be allowed to set within the borehole in order to insure sealing of the porous formation. It frequently happens that in drilling through the hardened cement the hole becomes sidetracked into the adjacent formations, thus requiring redrilling of all the hole below the point of sidetracking, perhaps including the zone of lost circulation. Similar disadvantages accompany the use of cement in sealing off water sands. A further disadvantage may arise due to the possibility that, in some cases, the cement may be forced into the oil-bearing formation to a distance sufficient to make it difficult or impossible subsequently to open the formation for production by the usual gun perforation methods.

More recently the use of resin-forming liquids capable of condensing to a solid resin under the influence of the formation temperature in place of cement has become known and has attained a limited applicability particularly in sealing water-bearing sands. While such resin-forming liquids offer certain advantages over cement, such as greater fluidity resulting in improved sealing properties and better resistance to natural brines and to acid such as used in acidizing wells, they fail to overcome the above discussed disadvantages which accompany the use of cement. Like cement, these resin-forming liquids solidify in the borehole, necessitating redrilling of that portion of the hole which thereby becomes plugged. Also, due to the greater fluidity of the resin-forming liquids as compared to cement grout, they are even more apt to penetrate an oil-bearing stratum to such extent that subsequent opening of the stratum for production becomes impossible. A further disadvantage of this type of sealing agent arises when there are substantial variations in penetrability of the earth surrounding the portion of the borehole to be sealed off, as occurs in the case of a highly porous formation adjacent to a less porous formation or as may be caused by crevices within a formation. In such cases a very large amount of the resin-forming liquid may be forced into the more penetrable portions of the surrounding earth before an effective seal of the less penetrable portions is obtained, with the result that the expense involved in carrying out the sealing operation becomes excessive.

The present invention is directed to and provides an improved sealing agent which overcomes the above-discussed disadvantages of sealing agents heretofore employed. The novel sealing composition according to this invention comprises a suspension in water of a thermosetting resin prepared by reacting urea and formalin or urea and furfural under condensation conditions, the resin being partially condensed to a particular intermediate stage requisite to impart to the suspension the desired sealing characteristics. This particular stage of condensation may be described as an intermediate plastic solid stage. The partially condensed resin corresponding thereto is dispersible in water, by conventional mechanical means and without the aid of an emulsifying agent, to a state which is substantially non-coalescing for at least five hours, i. e. the dispersed resin particles do not coalesce substantially when the suspension is permitted to stand for this period of time. The suspension obtained by dispersing in water the resin corresponding to the aforesaid particular intermediate plastic solid stage, which suspension constitutes the sealing agent of the present invention, is characterized by its ability, when forced into a bed of granular material such as sand or gravel having void spaces substantially larger than the size of the dispersed resin particles, to form a resin plug at the face of the bed, which, upon application of heat, will condense to a hard layer substantially impervious to drilling fluids. In other words, the suspension is capable of forming a resin plug or sheath at the face of a porous body without any considerable penetration of the resin into the body even though the latter has pores or voids which are substantially larger than the dispersed resin particles. Further, this resin plug under the influence of heat will condense to a hard sheath impervious to drilling fluids and having considerable mechanical strength as distinguished from a crumbly or powdery resin layer.

The aqueous suspensions of the present invention have the great advantage over previously known sealing agents of not forming a difficultly drillable solid mass within the well bore. While the resin particles of the suspension which remains in the borehole may coalesce to an extent with time, the coalesced resin upon curing under borehole conditions does not become the hard solid mass that is obtained when a resin-forming liquid or cement grout is used as the sealing agent. Furthermore, after the resin layer has been plastered out on the borehole wall, setting of unplastered resin to a solid mass within the borehole may be minimized or prevented by flushing out the suspension before the resin has had time to cure. This may be accomplished by circulating a stream of water into and out of the borehole, preferably slowly to insure against the possibility of flushing out part of the plastered resin layer. The resin layer remaining on the borehole wall and slightly penetrating the adjacent formation cures under the formation temperature to a hard sheath which generally may be of the order of one-quarter to one inch thickness. Thus, any oil-bearing stratum which has been sealed off may readily be opened up for production by the usual gun perforation method. A further advantage results from the ability of the suspension to plaster out at the face of even a very porous formation, such as one-quarter inch gravel, since this characteristic prevents deep penetration of the resin into the formation and thus reduces to a minimum the amount of resin required to obtain an effective seal. Also the fact that the sealing agent which remains in the borehole is composed partly of water instead of entirely of resin further reduces the amount of resin required for carrying out the operation.

The first step in the procedure of preparing the sealing agent of this invention comprises reacting urea and formalin (which consists of about 40% formaldehyde in aqueous solution) or urea and furfural under condensation conditions to the desired stage. An acid or alkaline catalyst may be used to change the speed of the reaction.

In the case of the urea-formaldehyde type resin, satisfactory sealing agents can be prepared within reasonable periods of reaction time when from 1½ to 2½ parts of formalin per part of urea by weight are used. When 1½ parts of formalin per part of urea are used, the presence of sodium hydroxide acts to decrease the speed of the reaction, whereas the presence of hydrochloric acid acts to increase the speed of reaction. Since, at this ratio, the reaction time without catalyst is quite short, the use of caustic soda to decrease the reaction rate at such a ratio may be advantageous in that it will facilitate the stopping of the condensation at the desired stage. The product, however, may be inferior to that obtained without a catalyst.

When the reactants are initially mixed, they form a white slurry. Two phases are present, solid urea and aqueous formaldehyde. The mixture is then brought to the reaction temperature, which is preferably between 90° C. and 100° C. During this increase in temperature or shortly thereafter, the mixture clears, becoming a single phase solution having the appearance of water.

Upon further reaction, the liquid becomes more viscous until a point is reached at which a second phase precipitates from the reaction mixture. This phase is the partially condensed urea-formaldehyde resin. The reaction mixture assumes a milky appearance, becoming denser and more opaque as the precipitated resin increases in quantity until a point is reached at which the stirring is no longer capable of keeping the reaction mixture relatively homogeneous and the resin phase becomes a distinguishable white mass, a soft, pasty semi-liquid material.

As the reaction proceeds still further, the resin mass gradually changes in appearance and properties, passing through a stage at which it is gummy and resembles a solid more than a liquid. Finally, the resin phase enters the stage wherein it is a plastic material, of properties that will be different according to the original reactant proportions and to the catalysis conditions prevailing in the reaction. It may be either a white, plastic solid or a white mass with the appearance and consistency of set gelatin, but in either case, in this stage, it is recognizably different from the resin phases of the earlier stages.

The above description of the behavior of the reaction mixture refers to the conditions prevailing at the reaction temperature, which is preferably an elevated temperature of about 90° C.–100° C. The conditions, however, at which the suitability of the resin product for use in the present invention are determined are those prevailing at ordinary temperatures of about 20° C.–30° C. In order to determine the room temperature properties of a resin phase produced after a given period of reaction time has elapsed, the resin phase may be separated from the rest of the reaction mixture and mixed with cold water to reduce its temperature quickly and to prevent any further reaction beyond the time at which it is desired to know the room temperature properties of the resin product.

When the above procedure is carried out, it is discovered that the resin phase at room temperature may have a different appearance than at the reaction temperature. For example, a reaction mixture that is still a pasty semi-liquid at the reaction temperature may, at certain reactant ratios and under certain catalysis conditions, become a heterogeneous system upon cooling with water, in which system the resin phase is a gummy semi-solid mass, or even a plastic solid or gelatinous material.

Regardless of what change of appearance may occur upon cooling, the stage in which the cooled resin product is a white plastic solid or gel is the desired intermediate plastic solid stage at which the resin product is dispersible in water to form a suspension which is substantially stable for a reasonable time, such as at least five hours.

If the reaction is stopped before the intermediate plastic solid stage is reached, the result will be a product which will be unsatisfactory for use in the present invention. Such products include products which are, when cool, liquids or sticky semi-liquids or gummy semi-solids. A product which is liquid when cool may be suspendible in water with the aid of an emulsifying agent, but the suspension will not plaster on coarse sand, but instead penetrate deeply into formations of any substantial porosity. A product of the sticky, semi-liquid type when cool cannot be suspended at all. A product of the gummy, semi-solid type may be difficultly suspendible, but the suspension will tend to coalesce within a short time, that is within five hours.

While reaction temperatures of 90° C.–100° C. have been described as optimum, it is to be noted that higher and lower temperatures may be used with satisfactory results in both the formalin and furfural reactions.

In the case of the urea-furfural type resin, satisfactory sealing agents can be prepared within reasonable reaction times when from one to six parts of furfural per part of urea by weight are used.

When the reactants are initially mixed, they form a black mixture in which two phases are present, solid urea and liquid furfural. The initial appearance of this mixture, when agitated, differs according to the relative proportions of reactants used. When urea predominates, the mixture has the appearance of a black slurry. Mixtures with increasing proportions of furfural tend more to the appearance of a liquid than a slurry. At high ratios of furfural to urea, the initial mixture appears under agitation to be a viscous liquid; solid constituents are not readily discernible.

After the reactants are mixed, they are brought to the reaction temperature, which is preferably between 90° C.–100° C. During this heating, the agitated mixture becomes more homogeneous in appearance, tending more toward liquid, rather than slurry, nature. As the reaction proceeds, however, partially condensed resin begins to form, whereupon the mixture will begin to become more viscous again, and the solid constituents will become more readily distinguishable, so that the mixture itself begins to behave less like a liquid and more like a solid under the agitation. The partially condensed resin which is formed remains during the entire reaction well distributed throughout the reaction mixture; that is, there is no formation of a readily separable or distinguishable resin phase.

Upon still further reaction, a stage is reached wherein the partially condensed resin predominates to such an extent and is itself of a sufficiently advanced degree of condensation that the reaction mixture is composed of a black plastic solid admixed with just enough liquid to render it capable of being stirred.

The stage just described is the desired intermediate plastic solid stage at which the resin is suspendible in water by stirring and the suspension is capable of persisting for a substantial period of time, such as at least five hours. The reaction should be stopped during this stage. If it were stopped earlier and an attempt made to suspend the product without the aid of an emulsifying agent, either the product would not suspend or it would form a suspension incapable of persisting for five hours.

It is to be noted that the above described behavior of the reaction mixture will vary somewhat according to the initial reactant proportions, but in any case, the desired product is that obtained within the intermediate plastic solid range, and a few trial runs will enable a skilled operator to recognize from the appearance of the reaction mixture the proper stopping point for any given ratio within the operable range.

If, with either type of resin, the reaction is allowed to proceed too far, the resin will become too tough or hard for the suspended particles, upon plastering and curing on sand or gravel, to fuse together properly and thereby produce a resin layer having good mechanical strength. More or less concurrently, although not exactly so, the resin will tend to lose its ability to be dispersed in the conventional manner or at least will be dispersible only with great difficulty. The first indication, however, that the reaction is being carried past the desired stage is shown by the nature of the resin layer obtained on forcing an aqueous suspension of the resin product into a body of sand or gravel. Although the resin may still be suspendible and may plaster out from the suspension at the face of the porous material, the resulting resin layer after curing under the influence of heat will tend to have poorer mechanical strength, being hard but brittle if the reaction has proceeded somewhat further than is desirable and then becoming crumbly or powdery if the reaction has proceeded substantially past the desired stage.

The range in degree of condensation between a product which is too soft and one which is too hard to produce a suitable sealing agent is rather limited. It is important that the reaction be stopped within this range and preferably well within the range for this gives a product which is readily dispersible to a non-coalescing state, which will plaster out of the suspension properly yielding a resin layer which on curing becomes a strong sheath, and which, in addition, can withstand a reasonable amount of preheating of the suspension without substantial loss of plastering and curing qualities. This last-named property of retaining the desired sealing characteristics even after the suspension has been heated for a reasonable time (e. g., one hour at 150° F. or one-half hour at 200° F.) serves, in practice to insure effective sealing of the formation even when there is a substantial interval between the time of introducing the suspension into the borehole and the time it reaches, and the resin plasters out on, the formation.

The final step in the preparation of the sealing agent comprises forming the resin-in-water suspension. This may be carried out simply by vigorously mixing together the resin and water as by means of a motor-driven stirrer. In cases where a catalyst has been used to promote the condensation reaction, the catalyst may at this point be washed out of the partially condensed resin by first agitating the latter with several volumes of water until it is well dispersed, allowing the mixture to stand for a short time sufficient to permit dispersed particles to settle and form a concentrated suspension as the lower layer, decanting the excess water, then mixing the concentrated suspension with additional quantities of water and repeating the procedure until substantially all of the catalyst has been removed.

Even if a catalyst has not been used, it is desirable, though not strictly necessary, to wash the resin with water several times after decanting the liquid reaction products.

The following examples, in which parts are by weight, serve to illustrate the invention more specifically:

Example I

A series of runs was made in which for each of a number of varying ratios of urea to formalin the time required to form a product satisfactory for making the sealing agent was determined. No catalyst was used, and the temperature was maintained between 90° C.–100° C. With urea to formalin ratios between 2 to 3 and 2 to 5, products corresponding to the desired stage of condensation were obtained. At ratios beyond these limits, products could not be formed which would give suspensions capable of plastering on 10 mesh sand. At ratios within the limits, products satisfactory for forming the sealing agent were obtained at the following reaction times:

| Urea-formalin ratio | Reaction time, minutes |
|---|---|
| 2/3 | 10 |
| 1/2 | 105 |
| 2/5 | 100 |

Example II

A series of runs was made in which urea-formaldehyde resins were prepared, with reaction times varying in each run. In each run, 100 parts of urea and 200 parts of formalin were mixed, and the mixture was heated to a temperature of approximately 94° C. and reacted without catalysis at this temperature. During the reaction the mixture was constantly stirred by means of a motor-driven stirrer and the temperature was maintained near 94° C. by means of a constant temperature bath surrounding the vessel. After the reaction had been stopped, the resin was separated from the rest of the reaction mixture and the separated resin was tested for dispersibility and sealing qualities. The ability to form a non-coalescing suspension was determined by mixing with water in the manner described hereinbefore. The sealing qualities were determined by forcing the resulting suspension into a bed of 10 mesh sand, then curing the resin filter cake at a temperature of 200° F. and observing the character of the cured cake. The following results were obtained:

Reaction time=5 minutes. The product was a thick white paste at the reaction temperature and a soft, white semi-solid when cooled by contact with water. The resin formed a coarse suspension with water, which plastered on 20–30 mesh sand and cured in 4 hours to give a brittle filter cake.

Reaction time=10 minutes. The product was a thick white paste at the reaction temperature and a soft, white semi-solid at room temperature. The resin formed a coarse suspension with water, which plastered on 10 mesh sand and cured in 3½ hours to give a hard filter cake which fractured easily.

Reaction time=16 minutes. The product was a thick white paste at the reaction temperature and a soft, white semi-solid at room temperature. The resin formed a coarse suspension with water, which plastered on 10 mesh sand and cured in 6 hours to give a hard filter cake which fractured easily.

Reaction time=50 minutes. The product was a thick paste at the reaction temperature and a thick, gummy semi-solid at room temperature. The resin formed a coarse suspension with water, which plastered on 10 mesh sand and cured in 2½ hours to give a very brittle filter cake.

Reaction time=100 minutes. The product was a thick pasty material when hot and a gelatinous material when at room temperature. The resin suspended in water and plastered on 10 mesh sand, giving a satisfactory filter cake in 2 hours.

Reaction time=125 minutes. The product and resin obtained were similar to those obtained at 100 minutes. A satisfactory filter cake was formed in 3 hours on 10 mesh sand.

Reaction time=200 minutes. The product and resin obtained were similar to those obtained at 100 and 125 minutes. A satisfactory cake was formed in 2 hours on 10 mesh sand.

Reaction time=300 minutes. The product was a thick slurry when hot and a hard white solid when cold. The resin suspended in water and gave a brittle filter cake on 10 mesh sand in 2½ hours.

Reaction time=392 minutes. The product was a soft solid when hot and hardened considerably on cooling. The resin formed a suspension with water which showed a slight tendency to coalesce. The suspension plastered on 10 mesh sand, but would not soften sufficiently to form a satisfactory filter cake. This indicated that longer reaction times would not give products suitable for use in the present invention.

Example III

Runs were made at urea to formalin ratios of 2 to 3 with two different catalysts. The average temperature of reaction was in both cases 97° C.

With 1% of caustic soda in the reaction mixture, a product was obtained in 378 minutes that was satisfactory, though inferior in plastering qualities to the product obtained without a catalyst.

With 1% of concentrated hydrochloric acid in the reaction mixture, a satisfactory product was obtained in 5 minutes.

Since the required time in the uncatalyzed case of Example I was 10 minutes, it appears that at a 2 to 3 ratio, caustic soda greatly increases the time of reaction, while hydrochloric acid decreases it.

Example IV

A series of runs was made in which for each of a number of varying ratios of urea to furfural, the time required to form a product satisfactory for making the sealing agent was determined. No catalyst was used, and the temperature was maintained between 90° C. and 100° C. With urea to furfural ratios between 1 to 1 and 1 to 6, products corresponding to the desired stage of condensation were obtained. At higher ratios, the relative amount of solid in the reaction mixture was so great that the latter could not be stirred and conduction of the reaction under such conditions was impracticable. At lower ratios, products could not be formed which would give suspensions capable of plastering on 10 mesh sand. At ratios within the limits, products satisfactory for forming the sealing agent were obtained at the following reaction times:

| Urea-furfural ratio | Reaction time, minutes |
|---|---|
| 1/1 | 45 |
| 1/2 | 45 |
| 1/6 | 65 |

In sealing a formation by introducing the sealing agent into the borehole and forcing it into the formation, either the concentrated suspension or a dilute suspension of the resin may be used. It has been found that contamination of the sealing agent by minor amounts of drilling mud, such as may happen during actual use of the sealing agent in a well bore, does not cause any decrease in the plastering ability of the suspension nor does it cause any substantial loss in mechanical strength of the cured resin layer. However, drilling mud in amount over 50% in the suspension results in a resin layer having poorer mechanical strength and generally unsatisfactory for effecting a good seal.

We are aware that it has been proposed heretofore to incorporate a thermosetting resin or reactants capable of forming such resin in the drilling fluid circulated during the general drilling operation. The sealing agent herein described, however, is not a drilling fluid and is not suitable for use during the general drilling operation.

This application is a continuation-in-part of an application filed August 9, 1945, Serial No. 609,927, now U. S. Patent 2,457,160 issued December 28, 1948.

In our copending applications Serial Nos. 54,586 and 54,588 both filed October 14, 1948, of which 54,588 has matured into Patent 2,559,162 issued July 3, 1951, there are disclosed and claimed the methods of preparing sealing agents by condensing melamine or thiourea in certain proportions with formalin or furfural to an intermediate plastic solid stage at which the resin formed exhibits certain properties, stopping the reaction at that stage and dispersing the resin in water to form a non-colloidal aqueous suspension. The method of sealing a porous formation traversed by a borehole by means of the sealing agent of the present invention is not herein claimed as that forms the subject matter of our copending application Serial No. 609,928 filed August 9, 1945.

We claim:

1. Method of preparing a sealing agent for sealing porous formations which comprises reacting urea with a reactant selected from the group consisting of formalin and furfural under condensation conditions to form a thermosetting resin, the weight proportion of urea to the second-named reactant being within the range of one to 1½–2½ when said second-named reactant is formalin and one to 1–6 when said second-named reactant is furfural; continuing the reaction until the resin has reached an intermediate plastic solid stage at which it is, when said second-named reactant is formalin, a distinguishable mass in the reaction mixture and is dispersible by stirring in water without the aid of an emulsifying agent to form a non-colloidal suspension stable for at least five hours; stopping the reaction when said intermediate plastic solid stage is reached whereby to obtain a partially condensed resin capable of further condensation to a hard infusible stage upon application of heat; and dispersing the resin in water thereby forming, as the desired product, a non-colloidal aqueous suspension which, when forced into a bed of 10 mesh sand, will form a resin sheath at the face of the bed capable of thermosetting to a hard layer non-porous to drilling fluid.

2. A sealing agent prepared in accordance with the method defined in claim 1.

3. Method of preparing a sealing agent for sealing porous formations which comprises reacting urea with formalin in the weight proportion of one part of urea to 1½–2½ parts of formalin under condensation conditions to form a thermosetting resin; continuing the reaction beyond the stage at which the reaction mixture appears milky and until the resin has reached an intermediate plastic solid stage at which it is a distinguishable mass in the reaction mixture and is dispersible by stirring in water without the aid of an emulsifying agent to form a non-colloidal suspension stable for at least five hours; stopping the reaction when said intermediate plastic solid stage is reached whereby to obtain a partially condensed resin capable of further condensation to a hard infusible stage upon application of heat; and dispersing the resin in water thereby forming, as the desired product, a non-colloidal aqueous suspension which, when forced into a bed of 10 mesh sand, will form a resin sheath at the face of the bed capable of thermosetting to a hard layer non-porous to drilling fluid.

4. A sealing agent prepared in accordance with the method defined in claim 3.

5. Method of preparing a sealing agent for sealing porous formations which comprises reacting urea with furfural in the weight proportion of one part of urea to 1–6 parts of furfural under condensation conditions to form a thermosetting resin; continuing the reaction until the resin has reached an intermediate plastic solid stage at which it is dispersible by stirring in water without the aid of an emulsifying agent to form a non-colloidal suspension stable for at least five hours; stopping the reaction when said intermediate plastic solid stage is reached whereby to obtain a partially condensed resin capable of further condensation to a hard infusible stage upon application of heat; and dispersing the resin in water thereby forming, as the desired product, a non-colloidal aqueous suspension which, when forced into a bed of 10 mesh sand, will form a resin sheath at the face of the bed capable of thermosetting to a hard layer non-porous to drilling fluid.

6. A sealing agent prepared in accordance with the method defined in claim 5.

STEWART S. KURTZ, Jr.
JAMES S. SWEELY.

REFERENCES CITED

The following references are of record in the file of this patent:

UNITED STATES PATENTS

| Number | Name | Date |
|---|---|---|
| 1,899,109 | Ripper | Feb. 28, 1933 |
| 2,197,724 | Hovey et al. | Apr. 16, 1940 |
| 2,249,795 | Theis | July 22, 1941 |
| 2,294,873 | D'Alelio | Sept. 1, 1942 |
| 2,345,611 | Lerch et al. | Apr. 4, 1944 |
| 2,456,191 | Hewett | Dec. 14, 1948 |